United States Patent [19]

Goodfellow

[11] 4,055,619
[45] Oct. 25, 1977

[54] TIRE MANUFACTURE

[75] Inventor: Anthony Gerald Goodfellow, Maghull, near Liverpool, England

[73] Assignee: Dunlop Limited, London, England

[21] Appl. No.: 581,587

[22] Filed: May 28, 1975

[30] Foreign Application Priority Data

May 28, 1974 United Kingdom ............... 23564/74

[51] Int. Cl.² ........................... B29D 3/02; B29H 3/12
[52] U.S. Cl. .................................. 264/258; 264/275; 264/326; 264/328
[58] Field of Search ................. 264/36, 315, 326, 257, 264/258, 275, 279, 328, 329; 156/125; 152/361 R

[56] References Cited

U.S. PATENT DOCUMENTS

| 2,744,290 | 5/1956 | Corson | 264/326 X |
| 2,985,214 | 5/1961 | Lugli | 152/361 R X |
| 3,224,481 | 12/1965 | Lugli | 152/361 R X |

FOREIGN PATENT DOCUMENTS

| 1,508,135 | 1/1968 | France | 156/125 |
| 1,141,620 | 1/1969 | United Kingdom | |

Primary Examiner—Jan H. Silbaugh
Attorney, Agent, or Firm—Stevens, Davis, Miller & Mosher

[57] ABSTRACT

In moulding the tread portion of a pneumatic tire to have a breaker structure incorporated therein the breaker is built in an annular mould cavity to have a radially outermost 90° ply consisting of parallel cords extending axially of the cavity, and uncured rubber is introduced into the cavity through an annular gate surrounding the cavity so as to spread axially of the cavity. As the introduced uncured rubber does not move circumferentially of the cavity it has no tendency to displace the breaker cords.

2 Claims, 9 Drawing Figures

TIRE MANUFACTURE

The present invention relates to improvements in pneumatic tire manufacture and more specifically to improvements in means for moulding a tread portion of a pneumatic tire.

In commonly assigned co-pending U.S. Patent application Ser. No. 348,654 filed Apr. 6, 1973 which has been abandoned in favor of U.S. application Ser. No. 619,461, filed Oct. 3, 1975 and 579,238, filed May 20, 1975, there are described methods and apparatus for moulding a pneumatic tire. In commonly assigned co-pending U.S. Patent application Ser. No. 579,424, filed May 21, 1975, there is described a mould core or former for use in the tire moulding process.

In the moulding of tire components problems arise (a) in ensuring that the uncured rubber is not too greatly worked in the course of filling mould and (b) in ensuring that the introduction of uncured rubber into the mould cavity does not displace reinforcements previously located in the mould cavity.

A breaker is normally incorporated in a tire tread portion and this includes layers or plies each consisting of parallel cords extending in a given direction. There is a danger that during the introduction of uncured rubber into the mould cavity the cords of at least the topmost layer or ply of the breaker may be displaced by localized pressures to the detriment of the cured tire.

The present invention aims to minimize or obviate this difficulty.

According to one aspect of the present invention there is provided a method of moulding the tread portion of a pneumatic tire to have a breaker structure incorporated therein, the method comprising locating on the radially inner surface of an annular mould cavity for the tread portion an annular breaker structure having a single layer, or a radially outermost layer, consisting of parallel cords extending axially of the cavity and introducing uncured rubber into the cavity substantially uniformly in terms of volume and pressure around the circumference of the cavity through an annular gate in the radially outer surface of the cavity, said gate lying in a plane substantially perpendicular to the axis of the cavity so that the incoming flow of uncured rubber does not tend to displace the cords as the cavity is filled.

The method preferably comprises gripping the breaker structure near to opposite axial ends of the cavity while permitting the flow of uncured rubber past the gripping means to fill the cavity and introducing the uncured rubber through an annular gate at the center of the radially outer surface of the cavity.

According to another aspect of the invention there is provided apparatus for carrying out the method defined in the two immediately preceding paragraphs, the apparatus comprising mould components defining therebetween an openable, annular mould cavity for a pneumatic tire tread portion, means for supporting an annular breaker structure on the radially inner surface of the mould cavity so that the sole, or the radially outermost, layer of the breaker structure consisting of parallel cords extends axially of the mould cavity, and an annular gate in the radially outer surface of the mould cavity for the admission of uncured rubber into the cavity, the gate lying centrally of the cavity in a plane perpendicular to the axis of the cavity.

By this means uncured rubber is injected into the cavity substantially uniformly, in terms of volume and pressure, around the circumference of the cavity. This arrangement will be superior to one in which rubber is introduced through circumferentially separated gates or ports since rubber flowing into the cavity will divide and flow toward the opposite axial ends of the cavity substantially without any flow in the circumferential direction.

Preferably the mould part defining the radially outer surface of the cavity and formed with the annular gate comprises at least one annular reservoir for uncured rubber which surrounds the gate in spaced relation thereto, the reservoir communicating on its radially inner side with the gate via a relatively restricted annular passage and on its radially outer side with means for supplying uncured rubber under pressure to the cavity via the reservoir, the restricted passage and gate. A plurality of reservoirs may be provided concentrically surrounding the gate and interconnected by relatively restricted annular passages. The provision of the reservoir or reservoirs behind the gate has the effect of reducing or eliminating any pressure or volume differences which might otherwise exist at the gate around the cavity.

The topmost layer or ply of a breaker structure positioned in the cavity consists of a 90° ply consisting of parallel cords extending axially of the cavity. This is the same direction as that in which the divided flow of rubber moves after introduction into the cavity through the annular gate.

By the combination of the annular gate and a 90° ply it is ensured that the flow of rubber into the cavity has little or no component circumferentially of the breaker. Instead the divided rubber flow, moving toward the axial ends of the cavity, exerts all its force in the direction of the cords of the ply which it contacts and thus has no tendency to separate the cords or displace them from their original orientation.

In accordance with yet another feature of the invention the interior of the cavity-defining surface of the radially outer mould part is preferably formed with projections near to its axial ends which are positioned and dimensioned to contact the edges of a breaker structure in the cavity when the mould is closed, whereby the said edges are gripped between the projections and the radially inner surface of the cavity. This is a further measure to prevent displacement of the breaker ply cords under the action of rubber flowing into the mould cavity by gripping the edges of the breaker between the mould parts when the mould is closed. However, the extent of the projections radially of the mould cavity should be chosen so that although the breaker is adequately gripped the pressure of the projections on the breaker edges is not so great as to prevent penetration of the breaker plies immediately beneath the projections by the injected, uncured rubber. Furthermore, the projections preferably should not present a continuous annular barrier to the flow of rubber past them to the extreme axial ends of the cavity. Nevertheless, gaps between the projections to permit the flow of rubber should be oriented transversely to the breaker cords in such a way that every cord is gripped, when the mould is closed, between a projection and the radially inner mould part.

Preferred embodiments of the invention will now be described with reference to the accompanying drawings, in which.

Figure 1:
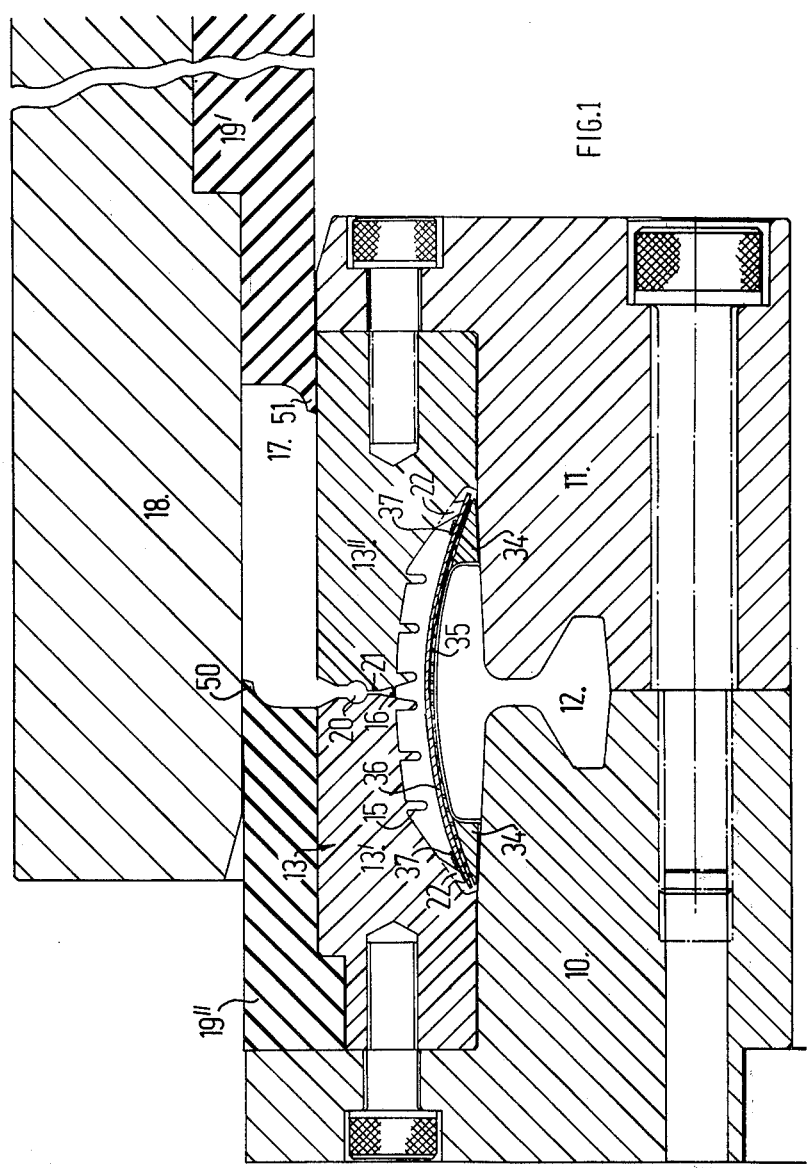
FIG. 1 is a radial section of a mould for a tire tread portion.

The mould for a tire tread portion illustrated in FIG. 1 comprises mould parts 10 and 11 which between them grip a deformable annular mould core or former 12. The core 12 is of the kind described in commonly assigned co-pending U.S. Patent application Ser. No. 579,424, filed May 21, 1975 and the operation of the mould parts 10 and 11 is as described in that application and in commonly assigned co-pending U.S. Patent application Ser. No. 579,238, filed May 20, 1975.

The mould includes a two-part radially outer mould part 13 which together with the parts 10 and 11 and the core 12 defines a cavity 14 for moulding a tire tread portion, the mould part 13 having projections such as 15 to form the tread pattern of the tire.

On a center line plane B intermediate the axial ends of the cavity 14 the two parts 13$^I$ and 13$^{II}$ of the radially outer mould part 13 are divided bean annular gate 16 through which uncured rubber may be introduced into the cavity 14. In the operation of the mould uncured rubber is introduced into an annular chamber 17 surrounding the mould part 13 and is expelled therefrom by sliding mould parts 18 and 19 to the left as viewed in FIG. 1, thereby reducing the size of the chamber 17. Rubber passing from the chamber 17 to the gate 16 first enters an annular reservoir or pot 20 in the mould part 13, the reservoir surrounding the gate 16 and being separated therefrom radially of the mould by a relatively restricted annular passage 21. The provision of the reservoir 20 unsures that rubber reaches the gate 16 in substantially equal volume and at substantially equal pressure throughout the circumferential extent of the gate 16. By this means it is ensured that rubber entering the cavity 14 has substantially no tendency to move circumferentially of the cavity 14 when spreading over a breaker assembly 35 on the former 12. Instead the flow of rubber, divided on encountering the breaker assembly 35 is substantially wholly in the axial direction of the cavity 14.

The tread reinforcement structure or breaker assembly 35 is located on the former 12 in the cavity 14 prior to closure of the mould. The breaker assembly 35 comprises a plurality of layers or plies each consisting of parallel textile or metal cords. The topmost ply 36 of the breaker structure is a 90° ply, which means that the parallel cords all extend axially of the cavity 14. By the arrangement illustrated it is ensured that inflowing rubber moves in the cavity 14 only in the same direction as that in which the cords of the ply 36 encountered by the rubber extend and therefore the rubber does not tend to displace the cords from their parallel orientation or pitch relationship. Secured to the underside of the breaker assembly 35 at its axial ends are filler pieces 34 of hard rubber which co-operate with the radially outer surface of the core 12 to provide a support for the breaker assembly 35 in the form of a continuous curve extending from end of the cavity 14.

As a further measure to prevent displacement of the breaker cords the mould part 13 is formed with projections 22 near the axial ends of the cavity 14. There is a discontinuous series of projections 22 near each end of the cavity 14 so that rubber can flow between circumferentially adjacent projections 22 to the extreme ends of the cavity 14.

The extend of each projection 22 radially of the mould is such that it will contact an edge of the breaker structure when the mould is closed so that the edges of the breaker structure are gripped between the projections 22 and the mould parts 10 and 11. However, the radial extent of each projection 22 is so chosen that the pressure exerted on the breaker edges is not so great as to prevent penetration of the breaker structure by uncured rubber introduced into the cavity 14 at the positions where the breaker edges are gripped between the projections 22 and the mould parts 10 and 11.

A band 37, consisting of several parallel cords or wires surrounding the breaker assembly 35, is provided near each end of the breaker assembly. The bands 37, which are a necessary part of the tire design, serve the additional purpose of holding the plies of the breaker assembly in place prior to engagement between the projections 22 and mould parts 10 and 11 and are located to engage behind the projections 22, as shown.

Figure 2:
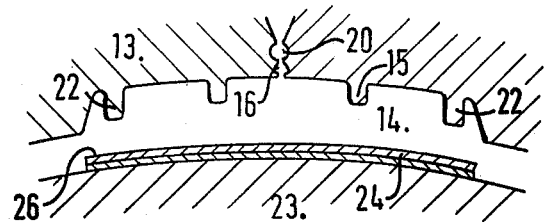
FIGS. 2 to 4 are similar views of an alternative mould illustrating different stages of the mould operation.
Figure 3:
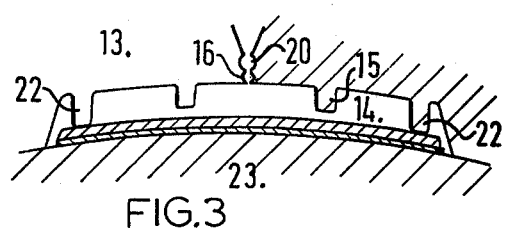
Figure 4:
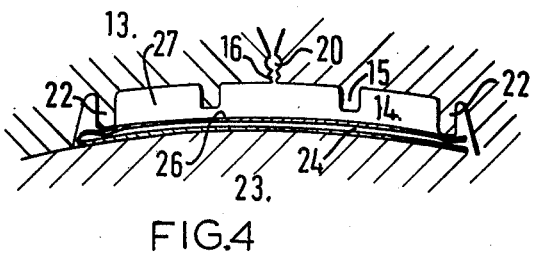

FIGS. 2 and 4 illustrate an alternative mould structure which is generally similar to that of FIG. 1 except that the relatively movable mould parts 10 and 11 and the core or former 12 are dispensed with and replaced by a single, integral radially inner mould part 23 on which the breaker structure 24 is directly laid. The breaker structure 24 comprises several plies or layers of which at least the uppermost 26 is a 90° ply in which the cords are parallel and extend axially of the annular cavity 17. Alternatively the layer 26 might be a metal mesh. In the operation of the mould of FIGS. 2 to 4 the mould parts 13 and 23 are relatively moved to the position of FIG. 4 in which the annular cavity 14 is closed, and in this position the projections 22 bear upon the breaker assembly 24 sufficiently to grip it but not sufficiently to prevent penetration of the breaker assembly by uncured rubber 27 introduced under pressure into the cavity 14 through the gate 16 as illustrated in FIG. 4.

Figure 5:
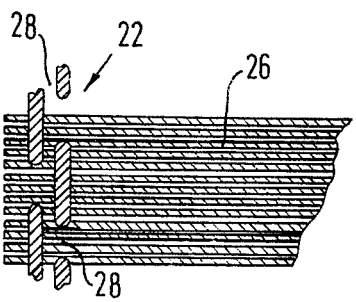
FIG. 5 is a view taken on the line V—V of FIG. 2.
Figure 6:
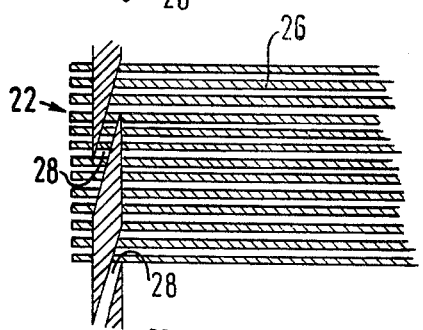
FIGS. 6 and 7 are views similar to FIG. 5 illustrating modifications of the projections.
Figure 7:
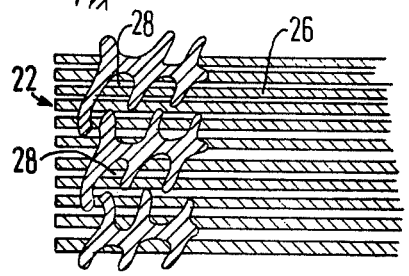

FIGS. 5 to 7 illustrate three possible configurations for the interrupted circumferential projections 22 at each end of the cavity 14. It will be seen that in each case the gaps 28 between the individual projections 22 near a respective end of the cavity 14 are angled obliquely with respect to the cords of the 90° ply 26. In each case the arrangement is such that every cord of the ply 26 is engaged by at least one of the projections 22 at some point along the length of the cord but gaps 28 are provided to facilitate flow of uncured rubber past the projections 22.

Figure 8:
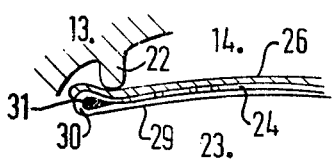
FIGS. 8 and 9 are views similar to FIG. 3 illustrating alternative breaker constructions.

FIG. 8 illustrates an alternative breaker structure in which between the uppermost, 90°0 ply 26 and the radially inner part 23 of the mould the breaker structure includes at least one folded edge 30 in which an annulus 31 of hard rubber is located. The position of the hard rubber ring 31 is such that by engagement with the projection 22, it tends to prevent movement of the breaker 24 to the right as viewed. It will be understood that the breaker structure includes rings 31 in folded edges 30 at each end of the breaker structure engaging behind projections 22 to tend to prevent displacement of the breaker assembly under the action of uncured rubber introduced into the cavity 14.

Figure 9:
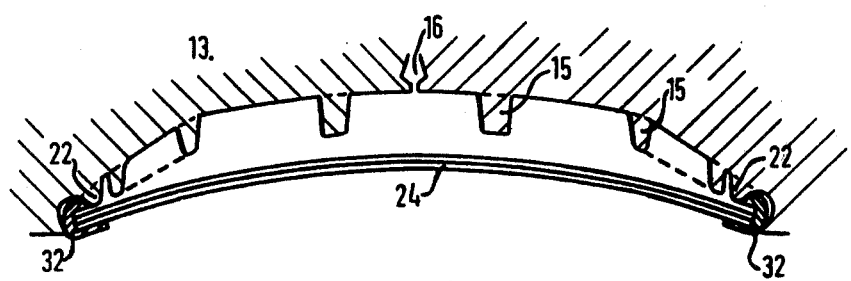

FIG. 9 illustrates yet another arrangement in which the opposite edges of the breaker assembly have secured to them hard rubber beads 32 which engage behind the projections 22 to prevent displacement of the breaker assembly.

It will be noted that the chamber 17, as shown in FIG. 1, is defined between the mould part 13 on its radially inner side and the mould part 18 on its radially outer side. The ends of the chamber are defined between a mould part 19' fast with the part 18 and a mould part 19" fast with the part 13'. By sliding the parts 18 and 19' to the left as viewed in FIG. 1 the axial length of the chamber 17 is reduced to force uncured rubber through the reservoir 20 and gate 16 into the cavity 14. The parts 19' and 19" thus co-operate to fulfill the function of an annular plunger. However, bands or lip seals 50 and 51 on radially opposite sides of the annular chamber 17 are provided at opposite axial ends of the chamber 17 and not both at the same end and on the same plunger element as in prior art arrangements. The provision of only one lip seal 50 or 51 on each part 19" and 19' defining the ends of the chamber 17 not only facilitates clearing of these parts by minimizes the effects of thermal expansion and contraction of each part 19' and 19" by comparison with a construction in which both lip seals 50 and 51 are provided on one of the parts 19' and 19".

Having now described my invention, what I claim is:

1. A method of molding the tread portion of a pneumatic tire which minimizes the displacement of axially extending cords in a breaker structure incorporated therein, the method comprising locating on the radially inner surface of an annular mold cavity for the tread portion an annular breaker structure having a single layer, or a radially outermost layer, consisting of parallel cords extending axially of the cavity and introducing uncured rubber into the cavity substantially uniformly in terms of volume and pressure around the circumference of the cavity through an annular gate in the radially outer surface of the cavity, said gate lying in a plane substantially perpendicular to the axis of the cavity whereby the incoming flow of uncured rubber into the cavity divides and flows toward the opposite axial ends of the cavity substantially without any flow in the circumferential direction so that it does not tend to displace the cords as the cavity is filled.

2. A method as claimed in claim 1, comprising gripping the breaker structure near to opposite axial ends of the cavity while permitting the flow of uncured rubber past the gripping means to fill the cavity and introducing the uncured rubber through an annular gate at the center of the radially outer surface of the cavity.

* * * * *